(12) United States Patent  
Kojima et al.

(10) Patent No.: US 12,055,168 B2  
(45) Date of Patent: Aug. 6, 2024

(54) FLUID DEVICE

(71) Applicant: SEIKO EPSON CORPORATION, Tokyo (JP)

(72) Inventors: Chikara Kojima, Matsumoto (JP); Tomohide Onogi, Shiojiri (JP); Kanechika Kiyose, Matsumoto (JP); Mitsuru Miyasaka, Shiojiri (JP); Mio Sasaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 449 days.

(21) Appl. No.: 17/388,473

(22) Filed: Jul. 29, 2021

(65) Prior Publication Data

US 2022/0034337 A1 Feb. 3, 2022

(30) Foreign Application Priority Data

Jul. 30, 2020 (JP) .................................. 2020-129406

(51) Int. Cl.
*F15D 1/02* (2006.01)
*G10K 11/26* (2006.01)

(52) U.S. Cl.
CPC ................ *F15D 1/02* (2013.01); *G10K 11/26* (2013.01)

(58) Field of Classification Search
CPC .......... F15D 1/02; G01K 11/26; G01N 15/14; G01N 19/22; G01N 29/03; C12N 13/00; C12M 1/33
See application file for complete search history.

(56) References Cited

U.S. PATENT DOCUMENTS

| | | | |
|---|---|---|---|
| 8,210,830 B2 | 7/2012 | Miyazaki et al. | |
| 2004/0173248 A1* | 9/2004 | Mitsumori | B08B 3/12 134/186 |
| 2010/0158720 A1 | 6/2010 | Miyazaki et al. | |
| 2012/0329122 A1* | 12/2012 | Lipkens | C12M 21/02 435/306.1 |
| 2019/0001696 A1 | 1/2019 | Okude et al. | |
| 2019/0191252 A1 | 6/2019 | Lipkens et al. | |

FOREIGN PATENT DOCUMENTS

| | | |
|---|---|---|
| JP | 2012006350 A | 1/2012 |
| JP | 2019006088 A | 1/2019 |
| WO | 2007013287 A1 | 2/2007 |

OTHER PUBLICATIONS

Ota N, Yalikun Y, Suzuki T, Lee SW, Hosokawa Y, Goda K, Tanaka Y. 2019 Enhancement in acoustic focusing of micro and nanoparticles by thinning a microfluidic device. R. Soc. open sci. 6: 181776.

Office Action for JP Patent Application No. JP2020129406, issued on Apr. 2, 2024, 5 pages of Office Action.

* cited by examiner

*Primary Examiner* — Walter D. Griffin
*Assistant Examiner* — Cameron J Allen
(74) *Attorney, Agent, or Firm* — Pramod Chintalapoodi (57) ABSTRACT

A fluid device includes: a flow path through which a fluid flows; a pressure chamber spaced apart from the flow path in a first direction (Y direction) orthogonal to a flowing direction of the fluid in the flow path; a communication path that is formed along the Y direction and that communicates the flow path with the pressure chamber; and an ultrasonic wave transmitter configured to transmit ultrasonic waves to the fluid in the pressure chamber to generate a standing wave along the Y direction in the flow path.

11 Claims, 8 Drawing Sheets

FLUID DEVICE

The present application is based on, and claims priority from JP Application Serial Number 2020-129406, filed Jul. 30, 2020, the disclosure of which is hereby incorporated by reference herein in its entirety.

BACKGROUND

1. Technical Field

The present disclosure relates to a fluid device.

2. Related Art

In related art, a fluid device that performs acoustic convergence on fine particles in a fluid is known.

For example, a fluid device disclosed in "Enhancement in acoustic focusing of micro and nanoparticles by thinning a microfluidic device", Nobutoshi Ota, 6 others, December 2019, Royal Society Open Science, Volume 6, Issue 2, Article No. 181776 includes a flow path substrate (glass substrate) in which a flow path is formed, and a piezoelectric element provided at the flow path substrate. An ultrasonic wave generated by the piezoelectric element is transmitted to an inside of the flow path via the flow path substrate, and generates a standing wave in a fluid in the flow path. Fine particles in the fluid converge in a predetermined range in the flow path due to a pressure gradient of the fluid formed by the standing wave.

However, in the fluid device disclosed in "Enhancement in acoustic focusing of micro and nanoparticles by thinning a microfluidic device", since a difference between an acoustic impedance of the fluid and an acoustic impedance of the flow path substrate is large, when the ultrasonic wave generated by the piezoelectric element is propagated from the flow path substrate to the fluid, most of the ultrasonic waves are reflected at a boundary between the flow path substrate and the fluid. Therefore, it is difficult to generate a standing wave having a large acoustic power in the flow path. As a result, it becomes necessary to increase a drive voltage and a driving frequency that are applied to the piezoelectric element.

SUMMARY

A fluid device according to the present disclosure includes: a first flow path through which a fluid flows; a pressure chamber spaced apart from the first flow path in a first direction orthogonal to a flowing direction of the fluid in the first flow path; a first communication path that is formed along the first direction and that communicates the first flow path with the pressure chamber; and an ultrasonic wave transmitter configured to transmit ultrasonic waves to the fluid flowing into the pressure chamber by coming into contact with the fluid to generate a first standing wave along the first direction for the fluid in the first flow path.

DESCRIPTION OF EXEMPLARY EMBODIMENTS

First Embodiment

Hereinafter, a fluid device 10 according to a first embodiment will be described with reference to FIGS. 1 and 2.

Figure 1:
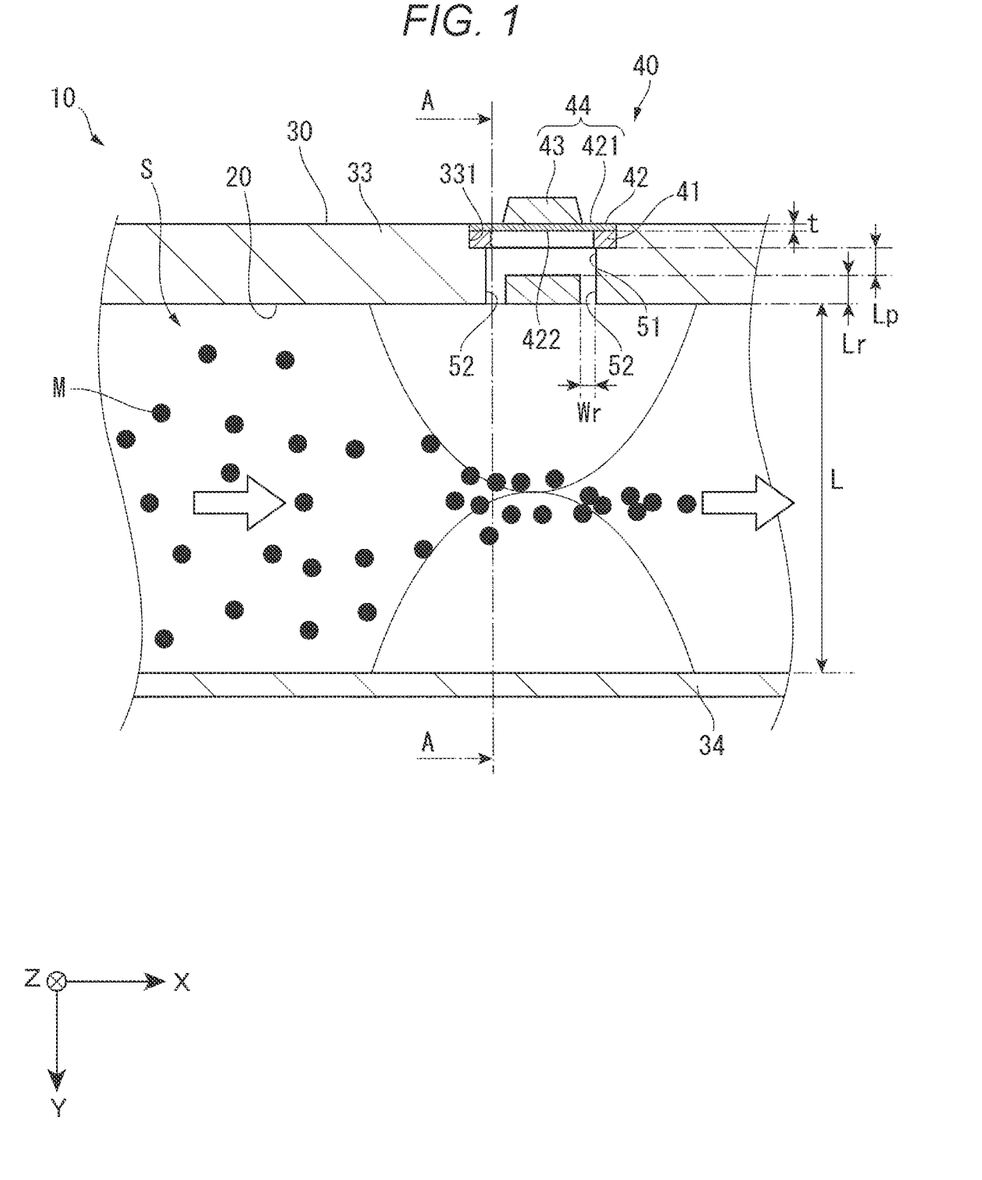
FIG. 1 is a cross-sectional view schematically showing a part of a fluid device according to a first embodiment.
Figure 2:
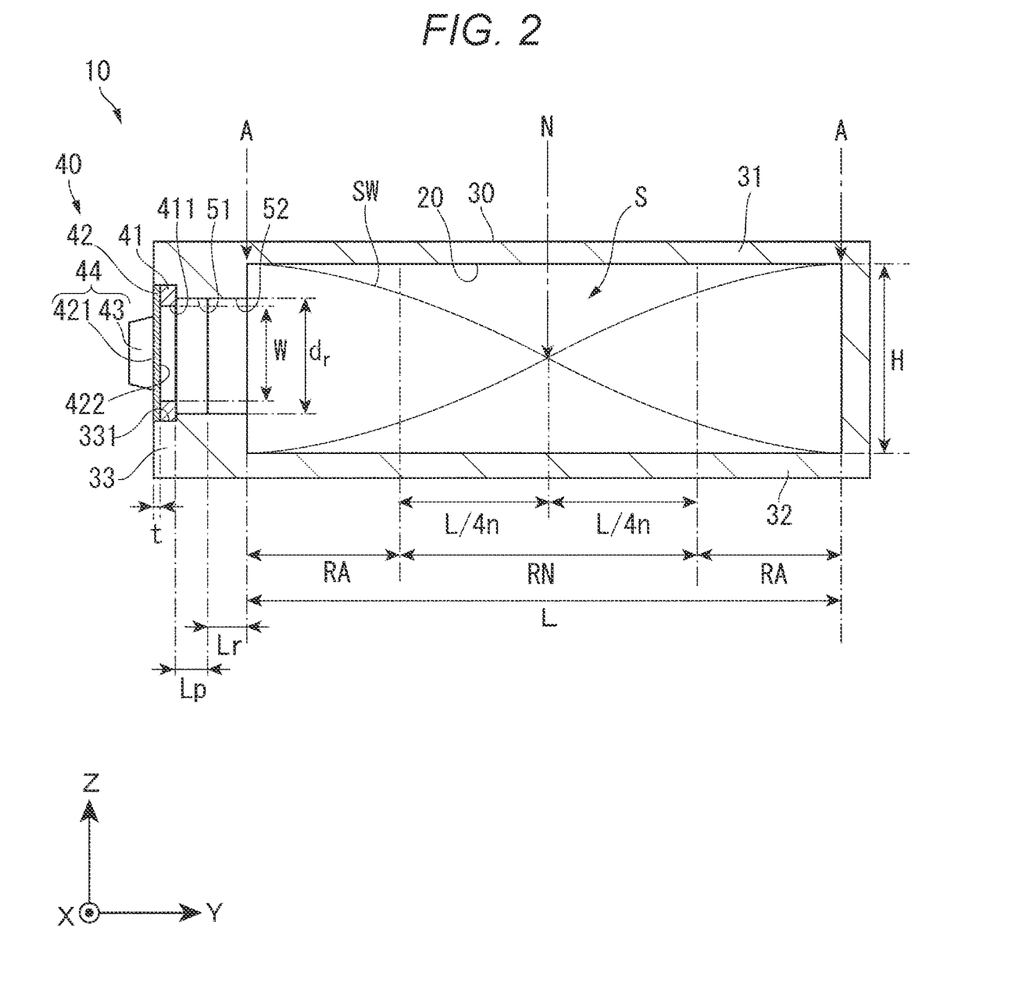
FIG. 2 is a cross-sectional view taken along a line A-A in FIG. 1.

FIG. 1 is a cross-sectional view schematically showing a part of the fluid device 10 according to the first embodiment, and FIG. 2 is a cross-sectional view taken along a line A-A in FIG. 1.

The fluid device 10 includes a flow path substrate 30 in which a flow path 20 and the like are formed, and an ultrasonic wave transmitter 40 provided at the flow path substrate 30.

In the fluid device 10, the ultrasonic wave transmitter 40 applies ultrasonic waves to a fluid S flowing through the flow path 20, thereby generating a standing wave SW with any mode order along one direction orthogonal to a flowing direction of the fluid S. In a process of fine particles M dispersed in the fluid S flowing through the flow path 20, the fine particles M are affected by a pressure gradient formed by the standing wave SW, and are converged in a predetermined range in the flow path 20.

In such a fluid device 10, for example, a concentration of the fine particles M in the fluid S can be increased by providing, in the flow path 20, a concentration flow path through which the fluid S in the predetermined range selectively flows and a discharge flow path through which the fluid S in a range other than the predetermined range selectively flows. In the predetermined range, the fine particles M are converged.

In FIG. 1, a state of the fine particles M converged by the standing wave SW of a first-order mode is schematically illustrated. In FIG. 2, illustration of the fine particles M is omitted, and the standing wave SW generated in the flow path 20 is shown as a pressure waveform.

Configuration of Fluid Device 10

A schematic configuration of the fluid device 10 will be described with reference to FIGS. 1 and 2.

The flow path substrate 30 is a substrate in which the flow path 20 (first flow path), a pressure chamber 51, and a communication path 52 (first communication path) are formed. The flow path substrate 30 can be formed, for example, by joining a pair of substrates having groove portions corresponding to the flow path 20, the pressure chamber 51, and the communication path 52 to each other. The substrates constituting the flow path substrate 30 are not particularly limited, and for example, a glass substrate or a silicon substrate can be used.

Although not shown, the flow path substrate 30 is formed with an injection port for injecting the fluid S into the flow path 20 and one or more discharge ports for discharging the fluid S from the flow path 20.

In the present embodiment, a cross section of the flow path 20 formed in the flow path substrate 30 is rectangular, and a depth direction of the flow path 20 coincides with a thickness direction of the flow path substrate 30. The flowing direction of the fluid S flowing through the flow path 20 is orthogonal to the depth direction of the flow path 20, and a width direction of the flow path 20 is orthogonal to each of the depth direction of the flow path 20 and the flowing direction of the fluid S.

Hereinafter, the flowing direction of the fluid S is referred to as an X direction, the width direction of the flow path 20 is referred to as a Y direction, and the depth direction of the flow path 20 is referred to as a Z direction. The X, Y, Z directions are orthogonal to one another.

The flow path substrate 30 includes an upper wall portion 31 constituting a wall portion of the flow path 20 on one side in the Z direction, a lower wall portion 32 constituting a wall portion of the flow path 20 on the other side in the Z direction, and side wall portions 33, 34 constituting wall portions of the flow path 20 on both sides in the Y direction.

The pressure chamber 51 is a storage chamber of the fluid S formed in the flow path substrate 30, and is spaced apart from the flow path 20 in the Y direction. In the present embodiment, the pressure chamber 51 is formed in the side wall portion 33 on one side of the flow path 20 in the Y direction, and may be formed in the side wall portion 34 on the other side of the flow path 20 in the Y direction.

The communication path 52 is a flow path that is formed inside the side wall portion 33 of the flow path substrate 30 and communicates the pressure chamber 51 with the flow path 20. The communication path 52 is formed along the Y direction and is coupled to a side portion of the flow path 20.

The flow path 20 is coupled to the pressure chamber 51 via the communication path 52, and the fluid S flowing through the flow path 20 flows into the pressure chamber 51. The pressure chamber 51 is filled with the fluid S.

In the present embodiment, a through hole 331 penetrating a portion of the side wall portion 33 of the flow path substrate 30 in the Y direction is formed. The portion is a wall portion of the pressure chamber 51.

The ultrasonic wave transmitter 40 is provided at the flow path substrate 30 so as to close the through hole 331, thereby forming a part of the wall portion of the pressure chamber 51.

The ultrasonic wave transmitter 40 includes an element substrate 41, a vibration film 42 supported by the element substrate 41, and a piezoelectric element 43 provided at the vibration film 42.

The element substrate 41 is a semiconductor substrate made of Si or the like. The element substrate 41 according to the present embodiment is disposed in the through hole 331 of the flow path substrate 30 such that a thickness direction of the element substrate 41 is along the Y direction, and an outer peripheral surface of the element substrate 41 is in liquid-tight contact with an inner peripheral surface of the through hole 331 of the flow path substrate 30.

The element substrate 41 is formed with an opening portion 411 penetrating the element substrate 41 along the thickness direction of the element substrate 41.

The vibration film 42 is formed of a laminated body or the like, in which a plurality of types of films are laminated, such as a $SiO_2$ film and a $ZrO_2$ film. The vibration film 42 is disposed such that a thickness direction of a vibrator 421 is along the Y direction, is provided at one surface of the element substrate 41, and closes one side (an opposite side of the opening portion 411 from a flow path 20 side) of the opening portion 411.

A portion of the vibration film 42 that overlaps the opening portion 411 when viewed from the thickness direction of the element substrate 41 constitutes the vibrator 421 that transmits ultrasonic waves. One surface of a pair of surfaces of the vibrator 421 that faces the opening portion 411 side serves as a fluid contact surface 422 that is to be in contact with the fluid S flowing into the opening portion 411 from the pressure chamber 51. That is, the vibrator 421 has the fluid contact surface 422 that is to be in contact with the fluid S in the pressure chamber 51.

Here, the vibration film 42 is disposed such that the thickness direction (a normal direction of the fluid contact surface 422) of the vibration film 42 is along the Y direction.

The piezoelectric element 43 is provided at an opposite-side surface of the vibrator 421 from the fluid contact surface 422. Although not shown, the piezoelectric element 43 is formed by sequentially laminating a lower electrode, a piezoelectric film, and an upper electrode on the vibrator 421.

In such an ultrasonic wave transmitter 40, an ultrasonic element 44 includes the vibrator 421 and the piezoelectric element 43 disposed on the vibrator 421.

In the ultrasonic element 44, the piezoelectric element 43 is coupled to a drive unit (not shown). When a drive signal is input to the piezoelectric element 43 from the drive unit, a voltage is applied between the lower electrode and the upper electrode, and the piezoelectric film expands and contracts. Accordingly, the vibrator 421 flexurally vibrates in the normal direction of the fluid contact surface 422 at a predetermined oscillation frequency corresponding to a dimension W (an opening width of the opening portion 411) of the vibrator 421 in a short-side direction or the like. The flexural vibration of the vibrator 421 is converted into a compressional wave of the fluid S to propagate the ultrasonic waves.

The ultrasonic waves propagated from the vibrator 421 to the fluid S in the pressure chamber 51 are radially diffused around the vibrator 421, and the ultrasonic waves thereof traveling in the Y direction reach the flow path 20 from the pressure chamber 51 via the communication path 52 and are repeatedly reflected by inner walls of the flow path 20, thereby generating the standing waves SW (first standing wave) in the flow path 20.

Here, in order to generate the standing wave SW in the Y direction in the flow path 20, a flow path width [m] L, which is a dimension of the flow path 20 in the Y direction, satisfies the following expression (1).

$$L = \frac{n \times C}{2F} \quad (1)$$

n is the mode order of the standing wave SW, C is a sound velocity [m/s] of a medium of the fluid S, and F is a driving frequency [Hz] of the piezoelectric element 43. The driving frequency F corresponds to the above-described oscillation frequency of the vibrator 421.

According to the above expression (1), it is assumed that when the sound velocity C of the medium is 1500 m/s when the medium is water, the mode order n of the standing wave SW is 1, and the driving frequency F of the piezoelectric element 43 is 600 kHz, the flow path width L is set to 1.25 mm.

In order to prevent generation of a standing wave in the Z direction in the flow path 20, a flow path depth H [m], which is a dimension of the flow path 20 in the Z direction, satisfies the following expression (2).

$$H < \frac{C}{2F} \quad (2)$$

That is, the flow path depth H is smaller than the flow path width L when the mode order n of the standing wave SW calculated by the above expression (1) is 1. That is, according to the above expressions (1), (2), the flow path 20 is formed such that the flow path depth H is smaller than the flow path width L.

Alternatively, in order to prevent the generation of the standing wave in the Z direction in the flow path 20, the flow path depth H may be set to be significantly larger than the flow path width L set by the above expression (1) without satisfying the above expression (2). In this case, a standing wave of a higher-order mode may be generated in the Z direction. However, such a standing wave of the higher-order mode has an acoustic power smaller than that of the standing wave SW generated in the Y direction, and thus an influence of the standing wave of the higher-order mode can be ignored.

Thickness of Vibrator 421

When the piezoelectric element 43 is driven, not only a transverse wave that causes the flexural vibration of the vibrator 421, but also a longitudinal wave that propagates inside the vibrator 421 is generated.

When a thickness t of the vibrator 421 is larger than a wavelength λ of the longitudinal wave, the longitudinal wave becomes dominant in the vibrator 421, and propagation efficiency of the ultrasonic wave from the vibrator 421 to the fluid S decreases. That is, this is equivalent to a state in which matching of acoustic impedances is not achieved.

Even when the thickness t of the vibrator 421 is smaller than the wavelength λ of the longitudinal wave, the longitudinal wave is slightly generated in the vibration film 42. In particular, when the thickness t of the vibrator 421 is equal to λ/4, the vibrator 421 functions as an acoustic matching layer of the longitudinal wave, and the longitudinal wave generated in the vibrator 421 is easily propagated to the fluid S. However, in a case of acoustic emission using the longitudinal wave, the propagation efficiency of the ultrasonic wave from the vibrator 421 to the fluid S is reduced as compared with a case of acoustic emission using the transverse wave.

Therefore, in the present embodiment, the vibrator 421 is formed such that the thickness t is smaller than ¼ of the wavelength λ of the longitudinal wave. That is, the thickness t [m] of the vibrator 421 satisfies the following expression (3).

$$t < \frac{\lambda}{4} \quad (3)$$

The thickness t of the vibrator 421 is a dimension of the vibrator 421 along the normal direction with respect to the fluid contact surface 422, and corresponds to a film thickness of the vibration film 42.

The wavelength λ [m] of the longitudinal wave in the above expression (3) is expressed by the following expression (4).

$$\lambda = \frac{C'}{F} \quad (4)$$

In the above expression (4), C' is an average sound velocity [m/sec] of the longitudinal wave generated in the vibrator 421, and F is the driving frequency [Hz] of the piezoelectric element 43.

According to the above expression (4), the above expression (3) is expressed by the following expression (5).

$$t < \frac{C'}{4F} \quad (5)$$

The driving frequency F in the above expression (5) satisfies the following expression (1) as described above.

$$L = \frac{n \times C}{2F} \quad (1)$$

In the above expression (1), L is the flow path width [m], n is the mode order of the standing wave SW, C is the sound velocity [m/s] of the medium of the fluid S, and F is the driving frequency [Hz] of the piezoelectric element 43.

According to the above expressions (1), (5), the thickness t of the vibrator 421 satisfies the following expression (6).

$$t < \frac{C'}{C} \times \frac{L}{2n} \quad (6)$$

The vibration film 42 according to the present embodiment is a laminated body of a plurality of films. That is, the vibrator 421 according to the present embodiment is constituted by a plurality of films. In this case, the average sound velocity C' of the longitudinal wave generated in the vibrator 421 is calculated according to the following method.

Here, when the number of films constituting the vibrator 421 is m, a thickness of each film constituting the vibrator 421 is $t_k$ (k=1, 2, ... m), and an average of the longitudinal wave sound velocities in each film constituting the vibrator 421 is $C_k$ (k=1, 2, ... m), the following expression (7) is established.

$$\frac{t}{C'} = \sum_{k=1}^{m} \frac{t_k}{C_k} \quad (7)$$

The thickness t of the vibrator 421 is expressed by the following expression (8).

$$t = \sum_{k=1}^{m} t_k \quad (8)$$

Therefore, according to the above expressions (7), (8), the average sound velocity C' of the longitudinal wave generated in the vibrator 421 is expressed by the following expression (9).

$$C' = \frac{\sum_{k=1}^{m} t_k}{\sum_{k=1}^{m} \frac{t_k}{C_k}} \quad (9)$$

From a viewpoint of improving the propagation efficiency of the ultrasonic wave from the vibrator 421 to the fluid S, it is desirable that the thickness t of the vibrator 421 is a smaller value while satisfying the above expression (6).

However, when the thickness t of the vibrator 421 becomes too small, a stress gradient in the thickness direction of the vibrator 421 becomes large, and thus, when the piezoelectric element 43 is driven, there is a high chance that the vibrator 421 is damaged.

Therefore, in the present embodiment, as a result of an experiment in which the piezoelectric element 43 is driven by changing the dimension W of the vibrator 421 in the short-side direction and the thickness t of the vibrator 421, it is preferable that the thickness t of the vibrator 421 satisfies the following expression (10).

$$8.03 \times 10^{-3} \times W \times E'^{-\frac{1}{3}} \times \left(\frac{n}{2} \times \frac{C}{L}\right) \leq t \qquad (10)$$

In the above expression (10), W is the dimension [m] of the vibrator 421 in the short-side direction, E' is an average Young's modulus [Pa] of the vibrator 421 when a Poisson's ratio is 0.3, n is the mode order of the standing wave SW, and C is the sound velocity [m/sec] of the medium of the fluid S. When the thickness t of the vibrator 421 is smaller than a thickness obtained by a left side of the above expression (10), there is a high chance that the vibrator 421 is damaged.

As described above, the vibrator 421 according to the present embodiment is constituted by a plurality of (m) films. In this case, the average Young's modulus E' of the vibrator 421 can be expressed by the following expression (11).

$$E' = \frac{4}{d_m^m} \sum_{i=1}^{i} E_i \{(d_i - \alpha)^m - (d_{i-1} - \alpha)^m\} \qquad (11)$$

α in the above expression (11) is defined by the following expression (12).

$$\alpha = \sum_{i=1}^{m} \frac{E_i(d_i^2 - d_{i-1}^2)}{2E_i(d_i - d_{i-1})} \qquad (12)$$

In the above expressions (11), (12), m is the number of films constituting the vibrator 421, and $E_i$ (i=1, 2, ... m) is the Young's modulus of each film constituting the vibrator 421 when the Poisson's ratio is 0.3.

$d_i$ is expressed by the following expression (13).

$$d_i = \Sigma_{k=1}^{i} t_k \qquad (13)$$

In the above expression (13), $t_k$ (k=1, 2, ... m) is the thickness of each film constituting the vibrator 421. That is, $d_i$ is a value obtained by adding the thicknesses $t_k$ of the films constituting the vibrator 421 up to an i-th thickness.

Here, when the fluid device 10 according to the present embodiment has the following configuration, it is preferable that the thickness t of the vibrator 421 falls within a range of the following expression (14) using the expression (6) and the expression (10) described above.

Dimension W of vibrator in short-side direction: 19 μm
Flow path width L: 375 μm
Sound velocity C of medium of fluid S: 1500 m/s
Mode order n of standing wave SW: 1

Vibration film 42: two-layer structure of $SiO_2$ film and $ZrO_2$ film
Film thickness t1 of $SiO_2$ film: 0.35 μm
Film thickness t2 of $ZrO_2$ film: 0.15 μm
Young's modulus $E_1$ of $SiO_2$: 75 GPa
Young's modulus $E_2$ of $ZrO_2$: 190 GPa
Sound velocity $C_1$ of $SiO_2$: 5900 m/s
Sound velocity $C_2$ of $ZrO_2$: 4650 m/s $$0.5 \times 10^{-6} \text{ (m)} \leq t < 685 \times 10^{-6} \text{ (m)} \qquad (14)$$

Arrangement of Communication Path 52

When the standing wave SW in the Y direction is generated inside the flow path 20, an antinode A at which an acoustic pressure becomes maximum and a node N at which the acoustic pressure becomes 0 periodically appear along the Y direction. The antinode A is at each of both end portions of the flow path 20 in the Y direction.

For example, as shown in FIG. 2, when the standing wave SW of the first-order mode is generated, the node N appears at a center portion of the flow path 20 in the Y direction, and the antinode A appears at each of both end portions of the flow path 20 in the Y direction. In this case, in the process of the fine particles M dispersed in the fluid S flowing through the flow path 20, the fine particles M are converged to a range corresponding to the node N of the standing wave SW, that is, the center portion of the flow path 20 in the Y direction (acoustic convergence).

Here, a range of the flow path 20 in the Y direction is divided into a node region RN corresponding to the node N of the standing wave SW and antinode regions RA corresponding to the antinodes A of the standing wave SW.

When the flow path width of the flow path 20 is L and the mode order of the standing wave SW is n, each node region RN is in a range from a center of each node N to ±L/4n in the Y direction, and each antinode region RA is in a range other than the range of the node region RN.

In this case, the communication path 52 is coupled to the antinode region RA of the flow path 20 corresponding to any antinode A in the standing wave SW. Accordingly, the ultrasonic wave transmitted from the pressure chamber 51 to the flow path 20 via the communication path 52 is applied to the antinode region RA in the flow path 20.

FIG. 2 shows the standing wave SW of the first-order mode, but the standing wave SW generated in the present embodiment may be any standing wave of an order mode equal to or greater than the first-order mode. The antinode region RA and the node region RN in the standing wave SW can be determined based on the mode order of the standing wave SW generated in the flow path 20, the dimension of the flow path 20 in the Y direction, and the like.

Configurations of Pressure Chamber and Communication Path

In the present embodiment, two communication paths 52 are provided at an interval in the X direction for one pressure chamber 51, and each communication path 52 communicates the pressure chamber with the flow path 20. Accordingly, a dimension of each communication path 52 in the X direction is smaller than a dimension of the pressure chamber 51 in the X direction. The number of communication paths 52 is not limited to two, and may be one or more.

A dimension of the communication path 52 in the Z direction is equal to or smaller than a dimension of the pressure chamber 51 in the Z direction and is equal to or smaller than the dimension of the flow path 20 in the Z direction.

Here, since the standing wave is generated in the fluid S in the flow path 20, and the standing wave is not generated in the fluid S in the pressure chamber 51 and the communication path 52, the pressure chamber 51 and the communication path 52 satisfy the following expression (15).

$$Lr + Lp \neq \frac{L \times M}{n} \quad (15)$$

In the above expression (15), Lr is a dimension [m] of the communication path 52 in the Y direction, Lp is a dimension [m] of the pressure chamber 51 in the Y direction, M is a natural number, n is the mode order of the standing wave SW, and L is the dimension (flow path width) [m] of the flow path 20 in the Y direction (see FIG. 1).

The fluid device 10 satisfies the following expressions (16) to (18).

$$w_r < 4 \times L \times n^{-\frac{1}{2}} \quad (16)$$

$$w_r \leq 0.3 \times d_r \quad (17)$$

$$\frac{Sr \times L}{n} \geq \delta \times Sb \quad (18)$$

In the above expressions (16), (17), $W_r$ is a width [m] of the communication path 52 in the X direction, L is the flow path width [m], n is the mode order of the standing wave SW, and $d_r$ is a depth [m] of the communication path 52 in the Z direction.

In a case where the above expressions (16), (17) are satisfied, when an ultrasonic wave emitted from the communication path 52 into the flow path 20 is reflected by a wall surface of the flow path 20 and returns to the communication path 52, a beam width of the ultrasonic wave becomes larger than the width $W_r$ of the communication path 52. That is, the beam width of the ultrasonic wave spreads wider than the width $W_r$ of the communication path 52.

In the above expression (18), Sr is a flow path cross-sectional area [m²] of all the communication paths 52 orthogonal to the Y direction, L is the flow path width [m], n is the mode order of the standing wave SW, Sb is an area [m²] of the fluid contact surface 422 of the vibrator 421, and δ is a displacement amount [m] of the vibrator 421 at the time of the vibration.

When the expression (18) is satisfied, a value obtained by dividing a volume of a range in the flow path 20 facing the communication path 52 in the Y direction by the mode order n of the standing wave SW is equal to or greater than a maximum variation amount of a volume of the pressure chamber 51 caused by the flexural vibration of the vibrator 421.

Effects of Present Embodiment

As described above, the fluid device 10 according to the present embodiment includes: the flow path 20 through which the fluid S flows; the pressure chamber 51 that is spaced apart from the flow path 20 in the first direction (Y direction) orthogonal to the flowing direction (X direction) of the fluid S in the flow path 20; the communication path 52 that is formed along the Y direction and that communicates the flow path 20 and the pressure chamber 51; and the ultrasonic wave transmitter 40 that transmits, by coming into contact with the fluid S flowing into the pressure chamber 51, ultrasonic waves to the fluid S to generate the standing wave SW along the Y direction for the fluid S in the flow path 20.

In such a configuration, since the ultrasonic wave transmitter 40 is in contact with the fluid S, the flow path substrate 30 is not interposed in a propagation path of the ultrasonic wave from the ultrasonic wave transmitter 40 to the fluid S. Accordingly, the ultrasonic wave is directly transmitted from the ultrasonic wave transmitter 40 to the fluid S, so that the standing wave SW can be easily generated in the flow path 20.

Figure 3:
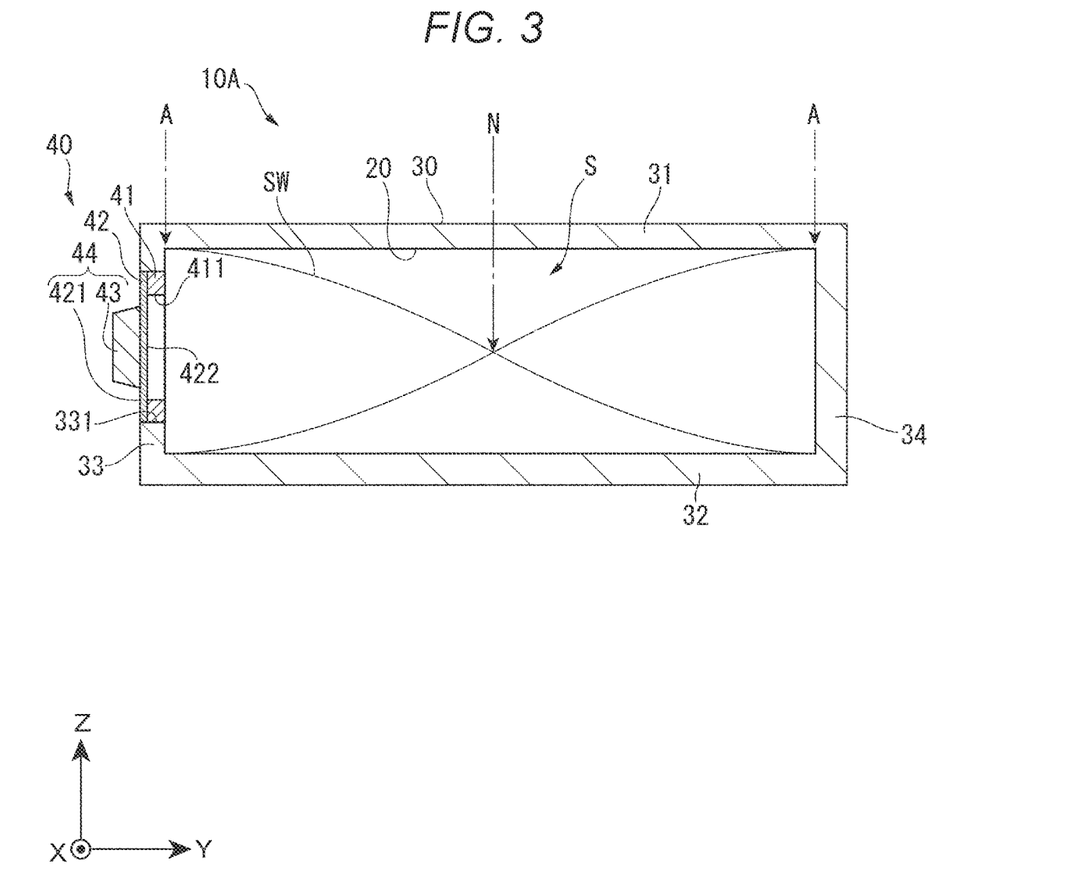
FIG. 3 is a cross-sectional view schematically showing a fluid device according to a comparative example.

Here, FIG. 3 shows a fluid device 10A according to a comparative example for the fluid device 10 according to the present embodiment. In the comparative example, components corresponding to those according to the present embodiment are denoted by the same reference numerals as the present embodiment.

The fluid device 10A according to the comparative example does not include the pressure chamber 51 and the communication path 52 as in the present embodiment, and the ultrasonic wave transmitter 40 faces the fluid S in the flow path 20. In such a comparative example, the ultrasonic wave reflected in the flow path 20 directly returns to the ultrasonic wave transmitter 40. Therefore, the ultrasonic wave transmitted from the ultrasonic wave transmitter 40 is weakened due to being defeated by the reflected and returned ultrasonic wave in the flow path 20, and it is difficult to superimpose the acoustic power of the ultrasonic wave in the flow path 20. That is, the acoustic power of the ultrasonic wave in the flow path 20 is determined by an acoustic power of a first transmitted ultrasonic wave, and it is difficult to add the acoustic power.

On the other hand, the fluid device 10 according to the present embodiment includes the pressure chamber 51 formed separately from the flow path 20, and the communication path 52 communicating the flow path 20 and the pressure chamber 51, and the ultrasonic wave transmitter 40 is in contact with the fluid S in the pressure chamber 51.

According to such a configuration, a part of the ultrasonic wave reflected by the wall surface of the flow path 20 returns to the ultrasonic wave transmitter 40 via the communication path 52, but a remaining part of the ultrasonic wave is reflected again by the wall surface of the flow path 20. Therefore, it is possible to prevent the ultrasonic wave transmitted from the ultrasonic wave transmitter 40 from being weakened by the ultrasonic wave reflected and returned from the flow path 20, increase a pressure in the pressure chamber 51, and add the acoustic power to the inside of the flow path 20.

Accordingly, in the present embodiment, it is possible to easily generate a standing wave having a large acoustic power in the flow path 20. Accordingly, the drive voltage and the driving frequency that are applied to the piezoelectric element 43 can be set to be lower than those in the related art, and the width of the flow path 20 in which the standing wave SW is generated can be wider than that in the related art. As a result, a volume flow rate of the fluid S that can be treated using the fluid device 10 can be increased.

In the present embodiment, since the fluid device 10 satisfies the above expressions (16), (17), the beam width of the ultrasonic wave is larger than the width $W_r$ of the communication path 52, and thus, an effect of reducing a proportion of the ultrasonic wave returning to the vibrator 421 can be suitably exhibited. Accordingly, the ultrasonic wave transmitted from the ultrasonic wave transmitter 40 can be suitably prevented from being weakened.

In the present embodiment, the dimension (flow path depth H) of the flow path 20 in the Z direction (second direction orthogonal to each of the flowing direction and the first direction) is smaller than the dimension (flow path width L) of the flow path 20 in the Y direction.

Accordingly, in the flow path 20, the generation of the standing wave in the Z direction can be prevented, and the standing wave SW in the Y direction can be suitably generated.

In the present embodiment, the communication path 52 is coupled to the antinode region RA of the flow path 20 corresponding to any antinode A in the standing wave SW.

In such a configuration, since the ultrasonic wave transmitted from the ultrasonic wave transmitter 40 is applied to the antinode region RA in the flow path 20 via the communication path 52, it is possible to improve the generation efficiency of the standing wave SW in the flow path 20.

In the present embodiment, the ultrasonic wave transmitter 40 includes the ultrasonic element 44, and the ultrasonic element 44 includes the vibrator 421 having the fluid contact surface 422 that comes into contact with the fluid S, and the piezoelectric element 43 that is provided at the vibrator 421 and flexurally vibrates the vibrator 421 in the normal direction of the fluid contact surface 422.

In such a configuration, since the flexural vibration of the vibrator 421 is converted into the compressional wave of the fluid S, it is possible to efficiently transmit the ultrasonic wave to the fluid S.

In the present embodiment, the fluid device 10 is formed such that the above expression (18) is established. Here, the value obtained by dividing the volume of the range in the flow path 20 facing the communication path 52 in the Y direction by the mode order n of the standing wave SW corresponds to a volume variation of a medium in the communication path 52. When the value is equal to or larger than the maximum variation amount of the volume of the pressure chamber 51 caused by the flexural vibration of the vibrator 421, the volume variation of the medium in the pressure chamber 51 due to deformation of the vibration film 42 is discharged as a volume variation of a medium in the communication path 52, and thus it is possible to prevent the pressure increase in the pressure chamber 51. Therefore, it is possible to prevent the vibration film 42 and the piezoelectric element 43 from being damaged.

In the present embodiment, the ultrasonic element 44 is disposed such that the normal direction of the fluid contact surface 422 is along the Y direction.

According to such a configuration, a main transmission direction of the ultrasonic wave from the ultrasonic element 44 coincides with a propagation direction of the ultrasonic wave combining the standing waves SW in the flow path 20. Accordingly, it is possible to further improve the generation efficiency of the standing wave SW.

In the present embodiment, the fluid device 10 is formed such that the above expression (6) is established. That is, the thickness of the vibrator 421 that comes into contact with the fluid S is formed to be smaller than ¼ of the wavelength λ of the longitudinal wave generated in the vibrator 421.

According to such a configuration, the generation of the longitudinal wave in the vibrator 421 and the propagation of the longitudinal wave from the vibrator 421 to the fluid S are prevented, and the matching of the acoustic impedances between the vibrator 421 and the fluid S in contact with the vibrator 421 is achieved. As a result, the propagation efficiency of the ultrasonic wave from the ultrasonic element 44 to the fluid S can be improved.

Second Embodiment

Next, a second embodiment will be described. In the following description, the same components as the first embodiment may be denoted by the same reference numerals, and the description thereof may be omitted or simplified.

Figure 4:
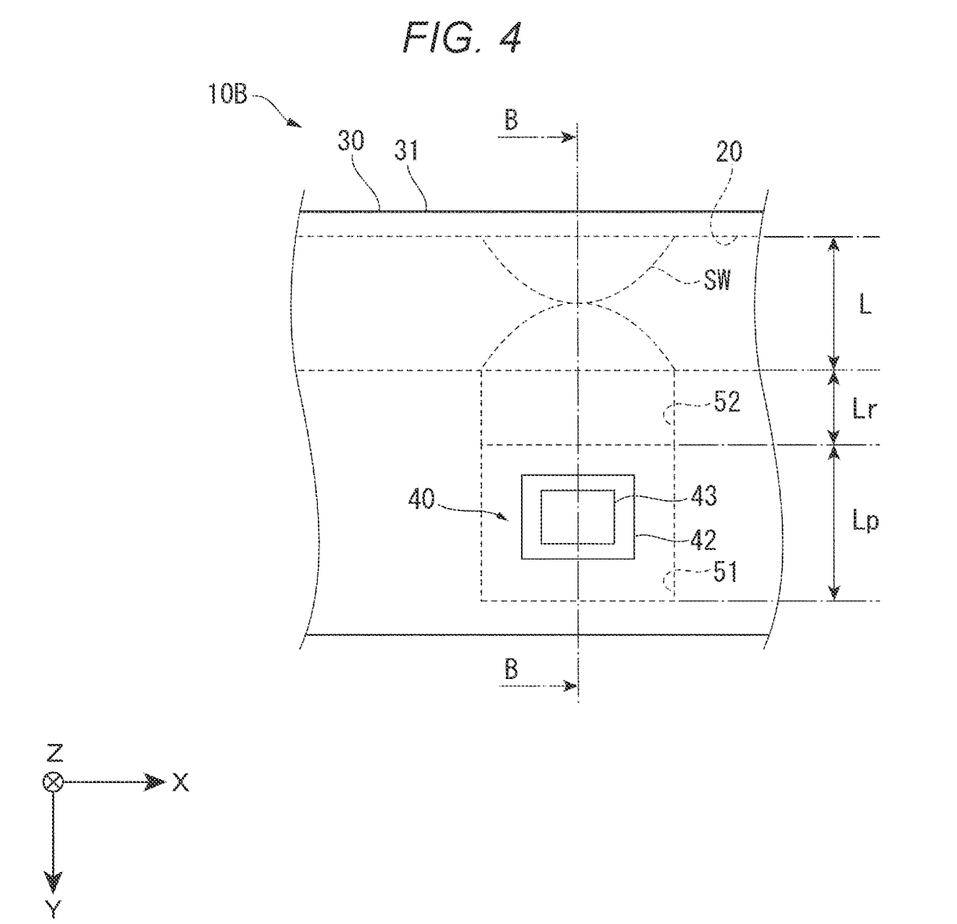
FIG. 4 is a cross-sectional view schematically showing a part of a fluid device according to a second embodiment.
Figure 5:
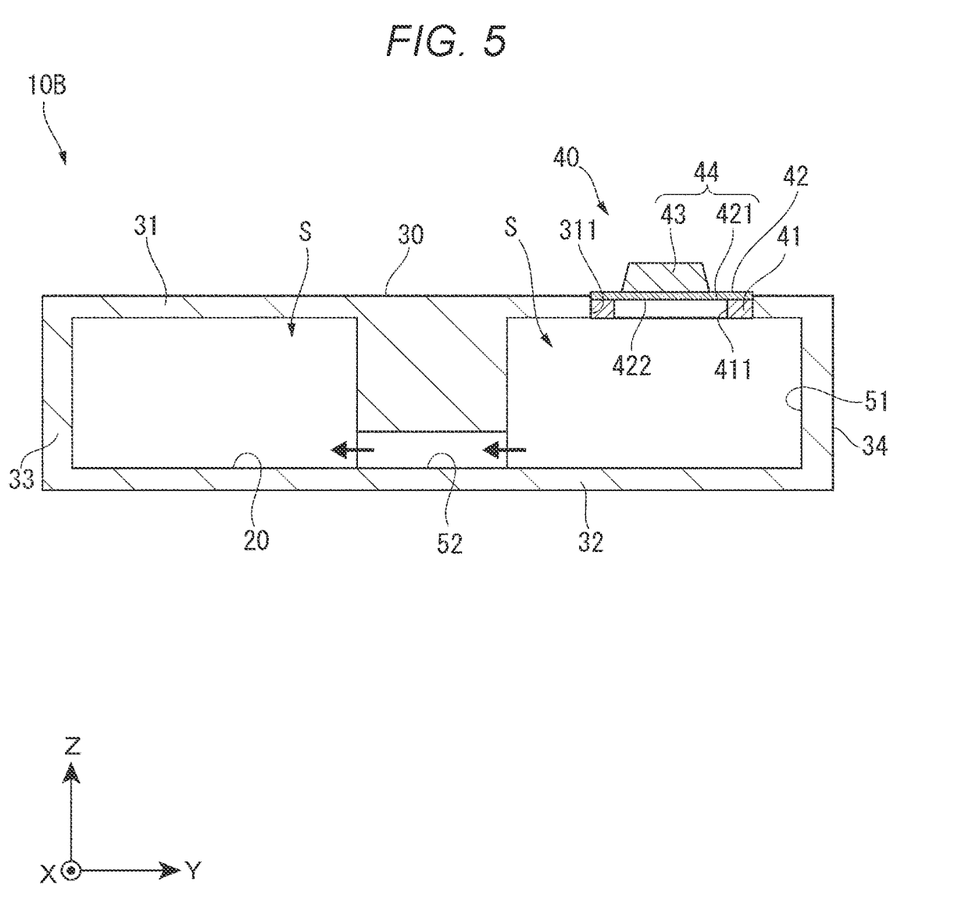
FIG. 5 is a cross-sectional view taken along a line B-B in FIG. 4.

FIG. 4 is a top view schematically showing a part of a fluid device 10B according to the second embodiment, and FIG. 5 is a cross-sectional view taken along a line B-B in FIG. 4. As shown in FIGS. 4 and 5, the fluid device 10B according to the second embodiment is different from the fluid device 10 according to the first embodiment mainly in the arrangement of the ultrasonic wave transmitter 40 with respect to the pressure chamber 51.

Specifically, in the flow path substrate 30 according to the second embodiment, a through hole 311 penetrating a portion of the upper wall portion 31 of the flow path substrate 30 in the Z direction is formed instead of the through hole 331 in the side wall portion 33 according to the first embodiment. The portion is the wall portion of the pressure chamber 51.

The ultrasonic wave transmitter 40 is provided at the flow path substrate 30 so as to close the through hole 311 of the flow path substrate 30, thereby forming a part of the wall portion of the pressure chamber 51.

The element substrate 41 of the ultrasonic wave transmitter 40 is disposed in the through hole 311 of the flow path substrate 30 such that the thickness direction of the element substrate 41 is along the Z direction, and the outer peripheral surface of the element substrate 41 is in liquid-tight contact with an inner peripheral surface of the through hole 311 of the flow path substrate 30.

In the first embodiment, two communication paths 52 are provided for one pressure chamber 51, but in the second embodiment, one communication path 52 is provided for one pressure chamber 51. The dimension of the communication path 52 in the X direction is equal to the dimension of the pressure chamber 51 in the X direction. The dimension of the communication path 52 in the Z direction is smaller than the dimension of the pressure chamber 51 in the Z direction and is smaller than the dimension of the flow path 20 in the Z direction.

In such a fluid device 10B according to the second embodiment, the pressure chamber 51 and the communication path 52 satisfy the above expressions (15) to (17).

Effects of Second Embodiment

According to the second embodiment described above, the same effects as the fluid device 10 according to the first embodiment can be achieved.

In the second embodiment, the ultrasonic wave transmitter 40 is disposed such that the thickness direction of the vibration film 42 is along the thickness direction (Z direction) of the flow path substrate 30, and thus MEMS technology can be easily used when the vibration film 42 and the piezoelectric element 43 are formed.

In the second embodiment, since an arrangement range of the ultrasonic wave transmitter 40 with respect to the flow path substrate 30 is not limited to a formation range of the flow path 20, it is easy to widen the arrangement range of the ultrasonic wave transmitter 40 with respect to the flow path substrate 30. Therefore, it is easy to provide a plurality of ultrasonic elements 44 in the ultrasonic wave transmitter 40 as described in a modification to be described later.

Third Embodiment

Next, a third embodiment will be described.

Figure 6:
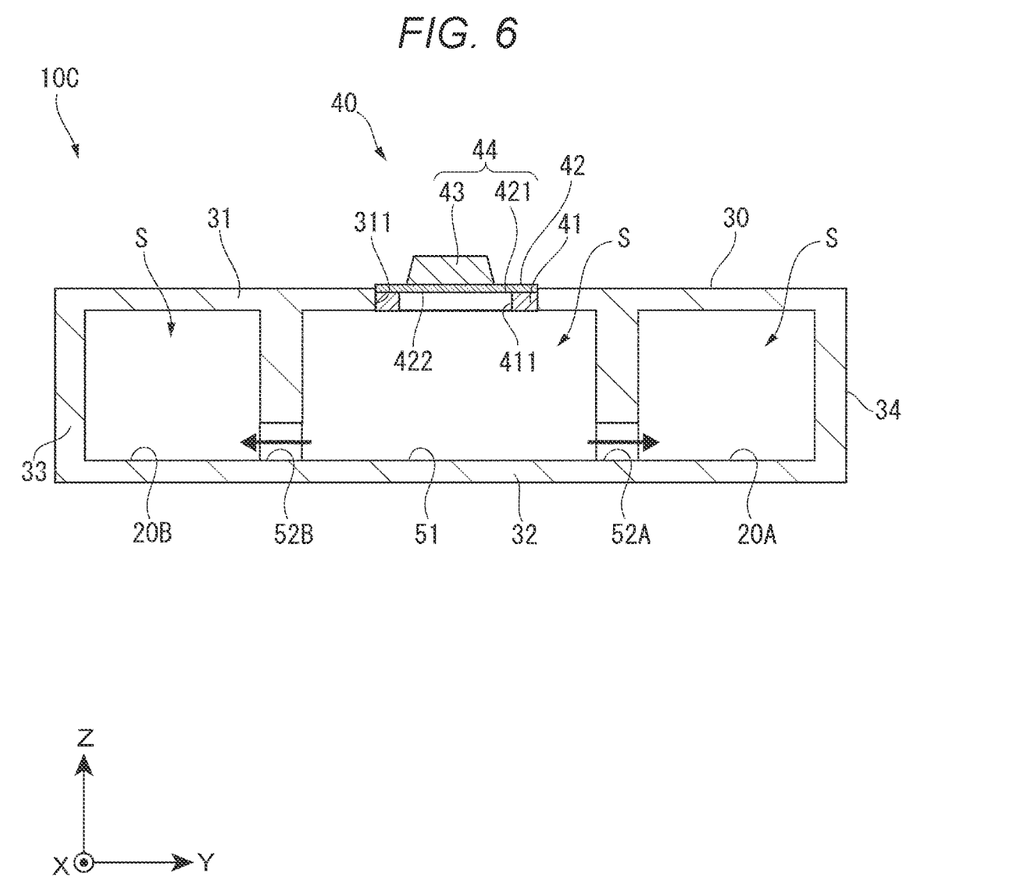
FIG. 6 is a cross-sectional view schematically showing a part of a fluid device according to a third embodiment.

FIG. 6 is a cross-sectional view schematically showing a part of a fluid device 10C according to the third embodiment. As shown in FIG. 6, the fluid device 10C according to the third embodiment is different from the fluid devices according to the first and second embodiments in the number of flow paths 20. That is, the fluid device 10C according to the third embodiment includes a first flow path 20A and a second flow path 20B which are two flow paths formed in the flow path substrate 30.

Specifically, the first flow path 20A and the second flow path 20B according to the third embodiment are disposed on both sides of the pressure chamber 51 in the Y direction. In other words, the first flow path 20A is spaced apart from the pressure chamber 51 in the Y direction, and the second flow path 20B is spaced apart from the pressure chamber 51 in the Y direction and is disposed on an opposite side of the pressure chamber 51 from the first flow path 20A in the Y direction.

The first flow path 20A and the second flow path 20B have the same configurations as the flow path 20 described in the first and second embodiments. For example, the first flow path 20A and the second flow path 20B satisfy the above-described expressions (1) and (2).

Further, the fluid device 10C according to the third embodiment includes a first communication path 52A that communicates the pressure chamber 51 with the first flow path 20A, and a second communication path 52B that communicates the pressure chamber 51 with the second flow path 20B.

Each of the first communication path 52A and the second communication path 52B according to the third embodiment is formed along the Y direction, and has the same configuration as the communication path 52 described in the above-described second embodiment. For example, the first communication path 52A and the second communication path 52B satisfy the above-described expressions (15) to (17).

In such a configuration, the ultrasonic waves transmitted from the ultrasonic wave transmitter 40 into the pressure chamber 51 are radially diffused around the vibrator 421, and the ultrasonic waves thereof traveling toward one side in the Y direction reach the inside of the first flow path 20A from the pressure chamber 51 via the first communication path 52A and are repeatedly reflected by inner walls of the first flow path 20A, thereby generating the first standing wave in the first flow path 20A in the Y direction. The ultrasonic waves traveling to the other side in the Y direction reach the inside of the second flow path 20B from the pressure chamber 51 via the second communication path 52B and are repeatedly reflected by inner walls of the second flow path 20B, thereby generating a second standing wave in the second flow path 20B in the Y direction.

Effects of Third Embodiment

According to the third embodiment described above, the same effects as the fluid devices 10 according to the first and the second embodiments can be achieved.

In the third embodiment, a sound wave energy of the standing wave generated in each of the first flow path 20A and the second flow path 20B is smaller than that of the standing wave SW generated in the flow paths 20 according to the first and second embodiments.

However, according to the third embodiment, since the ultrasonic wave can be propagated from one pressure chamber 51 to the first flow path 20A and the second flow path 20B which are two flow paths, a flow path density in the flow path substrate 30 can be improved.

In the third embodiment, the second flow path 20B is disposed on the opposite side of the pressure chamber 51 from the first flow path 20A. Here, the first flow path 20A and the second flow path 20B need to be arranged in the Y direction with respect to the pressure chamber 51. For example, as compared with a comparative example in which the first flow path 20A and the second flow path 20B overlap each other in the Z direction, in the third embodiment, a thickness of the fluid device 10 in the Z direction can be reduced, so that it is easy to reduce a size of the fluid device.

Fourth Embodiment

Next, a fourth embodiment will be described.

Figure 7:
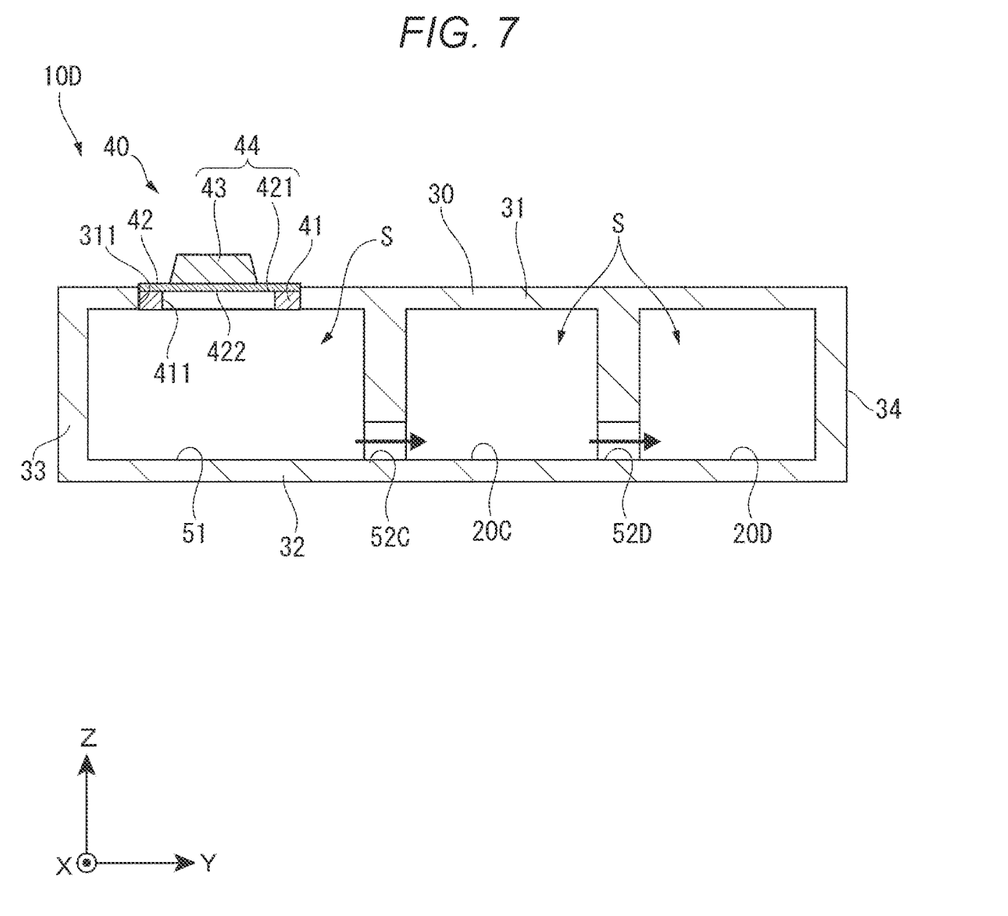
FIG. 7 is a cross-sectional view schematically showing a part of a fluid device according to a fourth embodiment.

FIG. 7 is a cross-sectional view schematically showing a part of a fluid device 10D according to the fourth embodiment. As shown in FIG. 7, the fluid device 10D according to the fourth embodiment includes, similarly to the above-described third embodiment, a first flow path 20C and a second flow path 20D which are two flow paths formed in the flow path substrate 30. However, arrangements of the first flow path 20C and the second flow path 20D according to the fourth embodiment are different from the arrangements of the first flow path 20A and the second flow path 20B according to the third embodiment.

In the fourth embodiment, the first flow path 20C and the second flow path 20D are disposed on one side of the pressure chamber 51 in the Y direction. In other words, the first flow path 20C is spaced apart from the pressure chamber 51 in the Y direction, and the second flow path 20D is spaced apart from the first flow path 20C in the Y direction and is disposed on an opposite side of the first flow path 20C from the pressure chamber 51 in the Y direction.

The first flow path 20C and the second flow path 20D have the same configurations as those of the flow paths 20 described in the first and second embodiments. For example, the first flow path 20C and the second flow path 20D satisfy the above-described expressions (1) and (2).

The fluid device 10D according to the fourth embodiment includes a first communication path 52C that communicates the pressure chamber 51 with the first flow path 20C, and a second communication path 52D that communicates the first flow path 20C with the second flow path 20D.

Each of the first communication path 52C and the second communication path 52D according to the fourth embodiment is formed along the Y direction, and has the same configuration as the communication path 52 described in the above-described second embodiment. For example, the first communication path 52C and the second communication path 52D satisfy the above-described expressions (15) to (17).

In such a configuration, the ultrasonic wave transmitter 40 transmits ultrasonic waves to the fluid S in the pressure chamber 51. The ultrasonic waves propagated from the vibrator 421 to the fluid S in the pressure chamber 51 are radially diffused around the vibrator 421, and the ultrasonic waves thereof traveling toward one side in the Y direction reach the inside of the first flow path 20C from the pressure chamber 51 via the first communication path 52C and are repeatedly reflected by inner walls of the first flow path 20C, thereby generating a first standing wave in the first flow path 20C in the Y direction.

A part of the ultrasonic waves that reach the inside of the first flow path 20C further reaches the inside of the second flow path 20D via the second communication path 52D, and are repeatedly reflected by inner walls of the second flow path 20D, thereby generating a second standing wave in the second flow path 20D in the Y direction.

Effect of Fourth Embodiment

According to the above-described fourth embodiment, the same effects as the fluid devices 10 according to the first and the second embodiments can be achieved.

In the fourth embodiment, a sound wave energy of the standing wave generated in each of the first flow path 20C and the second flow path 20D is smaller than that of the standing wave SW generated in the flow paths 20 according to the first and second embodiments.

However, according to the fourth embodiment, since the ultrasonic wave can be propagated from one pressure chamber 51 to the first flow path 20C and the second flow path 20D which are two flow paths, the flow path density in the flow path substrate 30 can be improved.

In the fourth embodiment, the second flow path 20D is disposed on the opposite side of the pressure chamber 51 with respect to the first flow path 20C. According to such a configuration, the ultrasonic wave propagated from the pressure chamber 51 to the first flow path 20C can be further efficiently propagated toward the second flow path 20D.

MODIFICATIONS

The present disclosure is not limited to the embodiment described above, and configurations obtained through modifications, alterations, and appropriate combinations of the embodiments within a scope of being capable of achieving the object of the present disclosure are included in the present disclosure.

First Modification

In each of the above-described embodiments, the example is described in which the ultrasonic wave transmitter 40 includes one ultrasonic element 44. However, the ultrasonic wave transmitter 40 may include a plurality of ultrasonic elements 44.

Figure 8:
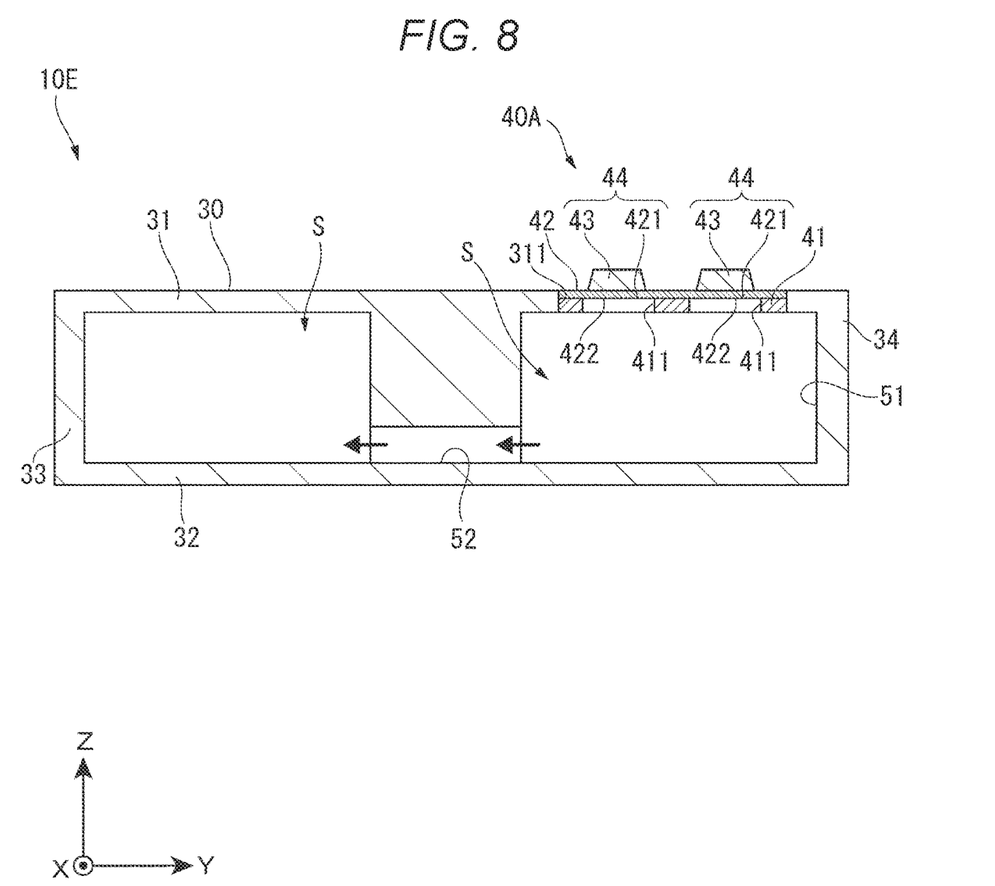
FIG. 8 is a cross-sectional view schematically showing a part of a fluid device according to a modification.

For example, FIG. 8 is a cross-sectional view schematically showing a fluid device 10E according to a modification of the above-described second embodiment. The fluid device 10E includes an ultrasonic wave transmitter 40A including a plurality of ultrasonic elements 44. In the ultrasonic wave transmitter 40A, a plurality of opening portions 411 are provided in an array for the element substrate 41, and a portion of the vibration film 42 provided at the element substrate 41 overlapping each opening portion 411 constitutes the vibrator 421. Each of the plurality of ultrasonic elements 44 is constituted by the vibrator 421 and the piezoelectric element 43 provided at the vibrator 421. Each ultrasonic element 44 has the fluid contact surface 422 that is in contact with the fluid S in the pressure chamber 51. According to such a modification, it is easy to improve a pressure in the pressure chamber 51.

When the ultrasonic wave transmitter 40 includes the plurality of ultrasonic elements 44, Sb in the above expressions (16) and (17) is a total area of the fluid contact surfaces 422 of the plurality of ultrasonic elements 44.

Second Modification

The specific configuration of the ultrasonic wave transmitter 40 described in each of the above-described embodiments can be modified in various ways.

For example, the element substrate 41 may be disposed outside the through holes 311, 331 of the flow path substrate 30. In this case, the opening portion 411 of the element substrate 41 overlaps the through holes 311, 331 of the flow path substrate 30, and a lower surface of the element substrate 41 is in liquid-tight contact with the flow path substrate 30.

The ultrasonic wave transmitter 40 may not include the element substrate 41, and the vibration film 42 may be provided at the flow path substrate 30. In this case, a portion of the vibration film 42 overlapping the through holes 311, 331 of the flow path substrate 30 constitutes the vibrator 421.

Third Modification

In each of the above embodiments, the standing wave SW is generated in the width direction (Y direction) of the flow path 20 serving as the first direction orthogonal to the flowing direction of the fluid S. However, the standing wave SW may be generated in the depth (Z direction) of the flow path 20. In this case, a configuration can be applied in which the Y direction that is described in the above-described embodiments is replaced with the Z direction.

Overview of Present Disclosure

A fluid device according to an aspect of the present disclosure includes: a first flow path through which a fluid flows; a pressure chamber spaced apart from the first flow path in a first direction orthogonal to a flowing direction of the fluid in the first flow path; a first communication path that is formed along the first direction and that communicates the first flow path with the pressure chamber; and an ultrasonic wave transmitter configured to transmit ultrasonic waves to the fluid flowing into the pressure chamber by coming into contact with the fluid to generate a first standing wave along the first direction for the fluid in the first flow path.

In such a configuration, since the ultrasonic wave transmitter is in contact with the fluid, another member is not interposed in a propagation path of the ultrasonic wave from the ultrasonic wave transmitter to the fluid. Accordingly, the ultrasonic wave is directly transmitted from the ultrasonic wave transmitter to the fluid, so that the standing wave can be easily generated in the flow path.

A part of the ultrasonic wave reflected by a wall surface of the flow path returns to the ultrasonic wave transmitter via the communication path, but a remaining part of the ultrasonic wave is reflected again by the wall surface of the flow path. Therefore, it is possible to prevent the ultrasonic wave transmitted from the ultrasonic wave transmitter from being weakened by the ultrasonic wave reflected and returned from the flow path, increase a pressure in the pressure chamber, and add the acoustic power to the inside of the flow path.

According to above configuration, it is possible to easily generate a standing wave having a large acoustic power in the flow path. Accordingly, a drive voltage and a driving frequency that are applied to the ultrasonic wave transmitter can be set to be lower than those in the related art, and a width of the flow path in which the standing wave is generated can be wider than that in the related art. As a result, a volume flow rate of the fluid S that can be treated using the fluid device can be increased.

In the fluid device according to the present aspect, when a dimension of the first flow path in the first direction is L, a mode order of the first standing wave is n, a dimension of the first communication path in the first direction is $W_r$, and a dimension of the first communication path in a second direction orthogonal to the flowing direction and the first direction is $d_r$, it is preferable to satisfy the following expression.

$$w_r < 4 \times L \times n^{-\frac{1}{2}}$$
$$w_r \leqq 0.3 \times d_r$$

In such a configuration, a beam width of the ultrasonic wave is larger than a width of the communication path, and thus an effect of reducing a proportion of the ultrasonic wave returning to the vibrator can be suitably exhibited. Accordingly, the ultrasonic wave transmitted from the ultrasonic wave transmitter can be suitably prevented from being weakened.

In the fluid device according to the present aspect, a dimension of the first flow path in the second direction orthogonal to the flowing direction and the first direction is smaller than the dimension of the first flow path in the first direction.

Accordingly, in the first flow path, generation of the standing wave in the second direction can be prevented, and the standing wave in the first direction can be suitably generated.

In the fluid device according to the present aspect, it is preferable that the first communication path is coupled to an antinode region in the first flow path that corresponds to any antinode in the first standing wave.

In such a configuration, since the ultrasonic wave transmitted from the ultrasonic wave transmitter is applied to the antinode region in the flow path via the communication path, it is possible to improve generation efficiency of the standing wave in the flow path.

In the fluid device according to the present aspect, it is preferable that the ultrasonic wave transmitter includes one or more ultrasonic elements, and the ultrasonic element includes a vibrator having a fluid contact surface that comes into contact with the fluid, and a piezoelectric element that is provided at the vibrator and that is configured to flexurally vibrate the vibrator in a normal direction of the fluid contact surface.

In such a configuration, since the flexural vibration of the vibrator is converted into a compressional wave of the fluid, it is possible to efficiently transmit the ultrasonic wave to the fluid.

In the fluid device according to the present aspect, when a cross-sectional area of the flow path orthogonal to the first direction of the first communication path is Sr, a total area of the fluid contact surfaces of the one or more ultrasonic elements is Sb, a maximum displacement amount of the vibrator during the vibration is δ, and a mode order of the first standing wave is n, it is preferable to satisfy the following expression.

$$\frac{Sr \times L}{n} \geqq \delta \times Sb$$

According to such a configuration, it is possible to prevent an excessive pressure increase in the pressure chamber, and thus it is possible to prevent the vibration film and the piezoelectric element from being damaged.

In the fluid device according to the present aspect, the ultrasonic element is disposed such that the normal direction of the fluid contact surface is along the first direction.

According to such a configuration, a main transmission direction of the ultrasonic wave from the ultrasonic element coincides with a propagation direction of the ultrasonic wave combining the standing waves in the flow path. Accordingly, it is possible to further improve the generation efficiency of the standing wave.

In the fluid device according to the present aspect, when a thickness of the vibrator is t, a sound velocity of a medium of the fluid is C, an average sound velocity of a longitudinal wave transmitted in the vibrator is C', a dimension of the first flow path in the first direction is L, and a mode order of the standing wave is n, it is preferable to satisfy the following expression.

$$t < \frac{C'}{C} \times \frac{L}{2n}$$

In such a configuration, generation of the longitudinal wave in the vibrator and propagation of the longitudinal wave from the vibrator to the fluid are prevented, and matching of acoustic impedances between the vibrator and the fluid in contact with the vibrator is achieved. As a result, propagation efficiency of the ultrasonic wave from the ultrasonic element to the fluid can be improved.

The fluid device according to the present aspect further includes: a second flow path that is spaced apart from the pressure chamber in the first direction and through which the fluid flows; and a second communication path that is formed along the first direction and that communicates the second flow path with the pressure chamber. The ultrasonic wave transmitter may transmit ultrasonic waves to the fluid flowing into the pressure chamber by coming into contact with the fluid to further generate a second standing wave in the second flow path along the first direction.

In such a configuration, since the ultrasonic wave can be propagated from one pressure chamber to the first flow path and the second flow path which are two flow paths, a flow path density in the fluid device can be improved.

In the fluid device according to the present aspect, it is preferable that the second flow path is disposed on an opposite side of the pressure chamber from the first flow path.

According to such a configuration, it is easy to reduce a size of the fluid device.

The fluid device according to the present aspect further includes: a second flow path that is spaced apart from the first communication path in the first direction and through which the fluid flows; and a second communication path that is formed along the first direction and that communicates the first flow path with the second flow path. The ultrasonic wave transmitter may transmit ultrasonic waves to the fluid flowing into the pressure chamber by coming into contact with the fluid to further generate a second standing wave in the second flow path along the first direction.

In such a configuration, since the ultrasonic wave can be propagated from one pressure chamber to the first flow path and the second flow path which are two flow paths, a flow path density in the fluid device can be improved.

In the fluid device according to the present aspect, it is preferable that the second flow path is disposed on an opposite side of the first flow path from the pressure chamber.

According to such a configuration, the ultrasonic wave propagated from the pressure chamber to the first flow path can be further efficiently propagated toward the second flow path.

What is claimed is:

1. A fluid device comprising:
   a first flow path through which a fluid flows;
   a pressure chamber spaced apart from the first flow path in a first direction orthogonal to a flowing direction of the fluid in the first flow path;
   a first communication path that is formed along the first direction and that communicates the first flow path and the pressure chamber; and
   an ultrasonic wave transmitter configured to transmit an ultrasonic wave to the fluid in the pressure chamber to generate a first standing wave along the first direction for the fluid in the first flow path, wherein $$w_r < 4 \times L \times n^{-\frac{1}{2}}$$
$$w_r \leq 0.3 \times d_r$$

wherein a dimension of the first flow path in the first direction is L, a mode order of the first standing wave is n, a dimension of the first communication path in the first direction is $W_r$, and a dimension of the first communication path in a second direction orthogonal to the flowing direction and the first direction is $d_r$.

2. The fluid device according to claim 1, wherein a dimension of the first flow path in the second direction orthogonal to the flowing direction and the first direction is smaller than the dimension of the first flow path in the first direction.

3. The fluid device according to claim 1, wherein the first communication path is coupled to a region in the first flow path that corresponds to any antinode in the first standing wave.

4. The fluid device according to claim 1, wherein
   the ultrasonic wave transmitter includes one or more ultrasonic elements, and
   each of the one or more ultrasonic elements includes
      a vibrator having a fluid contact surface that is in contact with the fluid, and
      a piezoelectric element that is provided at the vibrator and that is configured to generate flexural vibration to the vibrator in a normal direction of the fluid contact surface.

5. The fluid device according to claim 4, wherein $$\frac{Sr \times L}{n} \geq \delta \times Sb$$

wherein a cross-sectional area of the first flow path orthogonal to the first direction of the first communication path is Sr, a total area of fluid contact surfaces of the one or more ultrasonic elements is Sb, and a maximum displacement amount of the vibrator during the flexural vibration is δ.

6. The fluid device according to claim 4, wherein the one or more ultrasonic elements are disposed such that the normal direction of the fluid contact surface is along the first direction.

7. The fluid device according to claim 4, wherein $$t < \frac{C'}{C} \times \frac{L}{2n}$$

wherein a thickness of the vibrator is t, a sound velocity of the fluid is C, and an average sound velocity of a longitudinal wave transmitted in the vibrator is C'.

8. The fluid device according to claim 1, further comprising:
   a second flow path that is spaced apart from the pressure chamber in an opposite direction of the first direction and through which the fluid flows; and
   a second communication path that is formed along the first direction and that communicates the second flow path with the pressure chamber,
      wherein the ultrasonic wave transmitter transmits an ultrasonic wave to the fluid in the pressure chamber to further generate a second standing wave in the second flow path along the first direction.

9. The fluid device according to claim 8, wherein the second flow path is disposed on an opposite side of the pressure chamber from the first flow path.

10. The fluid device according to claim 1, further comprising:
    a second flow path that is spaced apart from the first communication path in the first direction and through which the fluid flows; and
    a second communication path that is formed along the first direction and that communicates the first flow path with the second flow path,
       wherein the ultrasonic wave transmitter transmits an ultrasonic wave to the fluid in the pressure chamber to further generate a second standing wave in the second flow path along the first direction.

11. The fluid device according to claim 10, wherein the second flow path is disposed on an opposite side of the first flow path from the pressure chamber.

* * * * *